(Model.)
B. HEBRON.
REAPER AND HARVESTER.
No. 275,649. Patented Apr. 10, 1883.
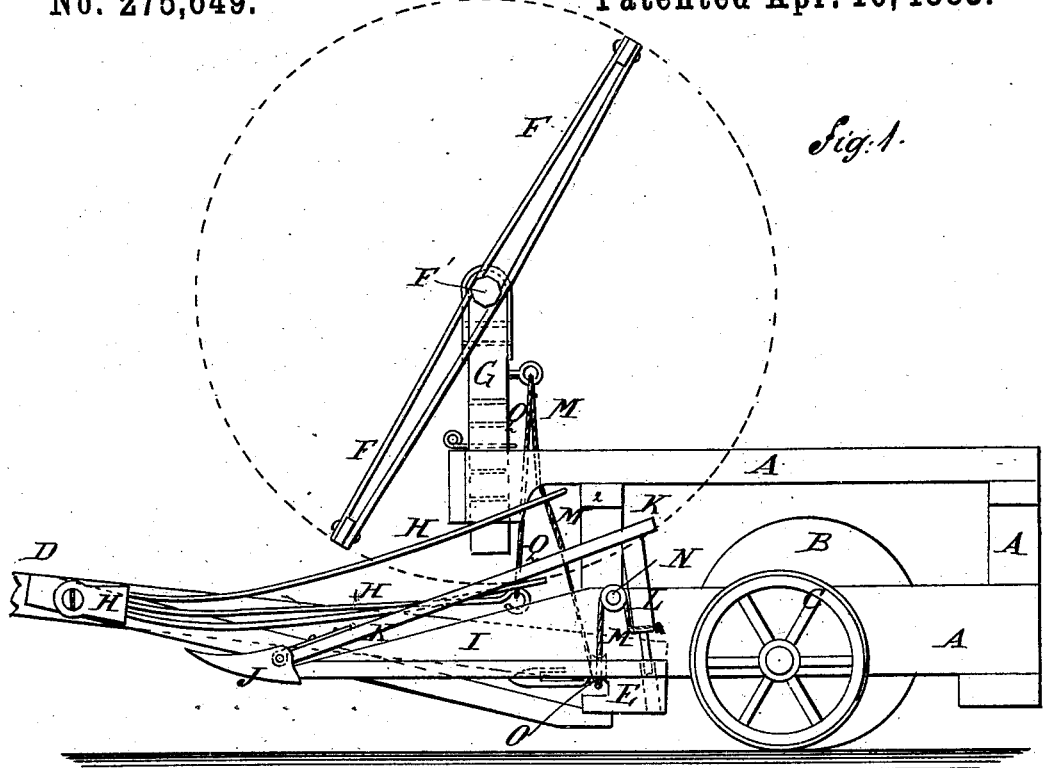
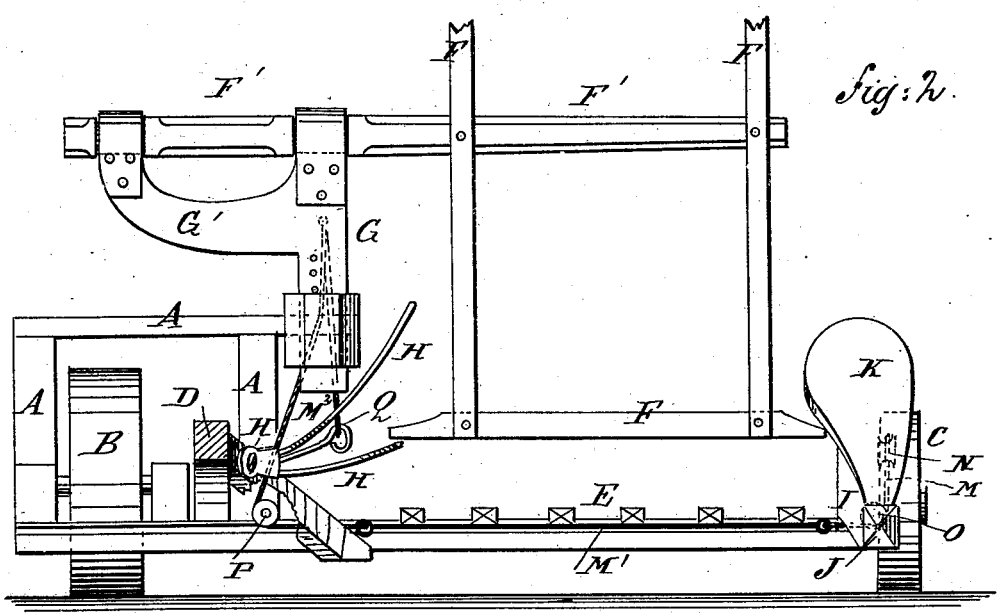
WITNESSES:
INVENTOR: B. Hebron
BY ATTORNEYS.

UNITED STATES PATENT OFFICE.

BENJAMIN HEBRON, OF CASSOPOLIS, MICHIGAN.

REAPER AND HARVESTER.

SPECIFICATION forming part of Letters Patent No. 275,649, dated April 10, 1883.

Application filed September 4, 1882. (Model.)

*To all whom it may concern:*

Be it known that I, BENJAMIN HEBRON, of Cassopolis, county of Cass, Michigan, have invented a new and useful Improvement in Reapers and Harvesters, of which the following is a full, clear, and exact description.

Reference is to be had to the accompanying drawings, forming a part of this specification, in which similar letters of reference indicate corresponding parts in both figures.

Figure 1 is a side elevation of my improvement, shown as applied to a reaper; and Fig. 2 is a front elevation of the same, the tongue being shown in section.

The object of this invention is to control and direct the grain at both edges of the swath while being cut, so that it will fall upon the platform in proper position for a sheaf.

The invention consists of guides attached to a reaper or harvester, and connected with the reel by chains or inelastic cords, with a rod running along the finger-bar, so that the guides will be raised and lowered by the raising and lowering of the reel in adjusting the reel to the varied conditions of the grain, as will be hereinafter fully described.

A represents the frame of a reaper or harvester. B is the drive-wheel. C is the grain-wheel; and D is the tongue, by means of which the machine is drawn and guided. E is the cutter-bar, which is constructed and operated in the ordinary manner. F is the reel, the shaft F' of which revolves in bearings in the reel-post G and its arm G', or in any other bearer connected with the reel-post.

The reel F is moved up and down by the ordinary means (which are not shown in the drawings) to adjust it as the condition of the grain being cut may require.

To the side of the tongue D is hinged the forward end or head of a controller or guide, H, which is formed by attaching two or more suitably-curved rods to a head-block perforated to receive a bolt that hinges the said guide to the tongue D.

The guide H is so formed that the ends of the bars of the reel F will pass beneath the upper rod of the guide H, so that the grain that may be hanging over the stubble will be guided within the sweep of the reel-bars, and will thus, when cut, be laid upon the platform in proper position for a sheaf.

To the grain-divider I, or to the horn or shoe J of the said divider, is hinged the forward end of a guide, K, which in the drawings is represented as being a board, but which may be made of any desired material or suitable form. The guide K projects to the rearward, inclines upward, and its inner edge inclines inward and projects so as to be within the sweep of the bars of the reel F, so that the bars of the reel will pass beneath the inner edge of the guide K, and the grain at the outer edge of the swath will be brought into the path of the sickles, and will be laid upon the platform in proper position for a sheaf, instead of being scattered along the stubble, as is the case with reapers and harvester constructed in the ordinary manner.

To the lower side of the rear part of the guide K is attached the upper end of a downwardly-projecting arm, L, to the lower end of which is attached the end of a rope or chain, M. The rope M passes over a guide-pulley, N, pivoted to the divider I, above the lower end of the arm L, passes around a guide-pulley, O, pivoted to the lower part of the divider I, and is attached to the end of a sliding rod, M', which passes along the finger-bar E below its guards or fingers. To the other end of the rod is attached the end of a rope, $M^2$, which passes around a guide-pulley, P, pivoted to the inner end of the said finger-bar, and its end is connected with the reel-bearer by an eyebolt or other suitable means, thus forming flexible connections between the reel and guides. With the reel-bearer is also connected the upper end of another rope or chain, Q, the lower end of which is connected with a rod of the guide H.

With this construction, as the reel F is raised and lowered to adjust it to the varying condition of the grain, the guides H K will be correspondingly raised and lowered by the same movements to keep the said guides in proper relative position with respect to the reel-bars and the grain.

With this improvement hanging and tangled grain will be straightened out by the combined action of the guides H K and the reel F and laid upon the platform in proper position for a sheaf, so that the sheaves will be even and compact, and there will be no scattering of the grain.

Having thus described my invention, I claim as new and desire to secure by Letters Patent—

1. A reaper or harvester constructed, substantially as herein shown and described, with guides at the ends of its cutter-bar, and connected by ropes or chains with the reel-bearer, whereby the grain at the edges of the swath will be guided into the path of the sickles and within the sweep of the reel, and the said guides will be adjusted by the movements of the reel-bearer in adjusting the reel, as set forth.

2. The combination, in a harvester, of the curved two-rod guide H, hinged to the side of tongue D, and the reel F, provided with bar ends passing beneath the upper rod of the guide, whereby the bent or fallen grain will be brought within range of the reel-bars, as described.

3. In a harvester, the guide K, hinged at its forward end to the divider I, projecting inwardly, inclined upwardly, and inclined inwardly at its inner edge, in combination with a reel, F, provided with bars passing beneath the inner edge of said guide, whereby the grain at the outer edge of the swath will be brought within range of the sickles, as described.

4. In a reaper or harvester, the combination, with the guide H, the guide K, having downwardly-projecting arm L, and the adjustable reel-bearer, of the connections $Q \ M \ M' \ M^2$, substantially as herein shown and described, whereby the said guides will be adjusted by the movements of the reel-bearer in adjusting the reel, as set forth.

BENJAMIN HEBRON.

Witnesses:
HATTIE E. ROBERTS,
JOSEPH L. STURR.